US009463791B2

(12) United States Patent
Takara (10) Patent No.: US 9,463,791 B2
(45) Date of Patent: Oct. 11, 2016

(54) VEHICLE AND VEHICLE CONTROL METHOD (71) Applicant: Atsushi Takara, Miyoshi (JP)

(72) Inventor: Atsushi Takara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/432,536

(22) PCT Filed: Oct. 2, 2012

(86) PCT No.: PCT/JP2012/075518
§ 371 (c)(1),
(2) Date: Mar. 31, 2015

(87) PCT Pub. No.: WO2014/054116
PCT Pub. Date: Apr. 10, 2014

(65) Prior Publication Data
US 2015/0266470 A1 Sep. 24, 2015

(51) Int. Cl.
B60L 9/00 (2006.01)
B60W 20/00 (2016.01)
B60K 6/445 (2007.10)
(Continued)

(52) U.S. Cl.
CPC .............. B60W 20/50 (2013.01); B60K 6/445 (2013.01); B60L 3/0023 (2013.01); B60L 3/0061 (2013.01); B60L 3/04 (2013.01); B60L 11/14 (2013.01); B60L 11/18 (2013.01); B60W 10/06 (2013.01); B60W 10/26 (2013.01); B60W 20/00 (2013.01); B60L 2240/441 (2013.01); B60L 2240/445 (2013.01); B60L 2250/10 (2013.01); B60L 2250/12 (2013.01); Y02T 10/6239 (2013.01);
(Continued)

(58) Field of Classification Search
CPC .... Y02T 10/705; B60L 11/12; B60L 1/1811; H01M 10/44; B60K 6/445
USPC .......................... 701/22, 29.1, 29.2; 320/150; 180/65.275; 903/903
See application file for complete search history.

(56) References Cited

U.S. PATENT DOCUMENTS

| 8,509,975 B2 * | 8/2013 | Izumi | B60K 6/28 320/150 |
| 2009/0192655 A1 * | 7/2009 | Ichikawa | B60L 11/1811 700/291 |
| 2009/0277705 A1 * | 11/2009 | Ichikawa | B60K 6/445 180/65.275 |

FOREIGN PATENT DOCUMENTS

| CN | 201945837 U | 8/2011 |
| JP | 2007-236023 | 9/2007 |

Primary Examiner — Gertrude Arthur Jeanglaud
(74) Attorney, Agent, or Firm — Finnegan, Henderson, Farabow, Garrett & Dunner, LLP (57) ABSTRACT In a vehicle capable of external discharging to supply electric power generated from motive power of a vehicle-mounted engine to a receiver external to the vehicle (hereinafter "engine-operated discharging"), an ECU determines, during engine operation, whether engine-operated discharging is being done. When engine-operated discharging is not being done, the ECU sets a first malfunction determination condition (condition that postulated misfire malfunction was detected in two trips) as an engine malfunction determination condition and, when the first malfunction determination condition is met, lights a check engine light. When engine-operated discharging is being done, the ECU sets a second malfunction determination condition (condition that postulated misfire malfunction was detected in one trip) as the engine malfunction determination condition and, when the second malfunction determination condition is met, lights the check engine light and automatically stops the engine.

10 Claims, 4 Drawing Sheets (51) Int. Cl.
   *B60L 3/00*      (2006.01)
   *B60L 3/04*      (2006.01)
   *B60L 11/14*     (2006.01)
   *B60W 10/06*     (2006.01)
   *B60L 11/18*     (2006.01)
   *B60W 10/26*     (2006.01)

(52) U.S. Cl.
   CPC ............. *Y02T 10/70* (2013.01); *Y02T 10/7077* (2013.01); *Y10S 903/93* (2013.01)

VEHICLE AND VEHICLE CONTROL METHOD

CROSS-REFERENCE TO RELATED APPLICATIONS

This application is a national phase application of International Application No. PCT/JP2012/075518, filed Oct. 2, 2012, the content of which is incorporated herein by reference.

TECHNICAL FIELD

The present invention relates to a vehicle capable of supplying electric power to an external electrical apparatus and a method for controlling the vehicle.

BACKGROUND ART

Recently, a technique has been developed to use a vehicle such as electric vehicle, hybrid vehicle, or the like as an electric power source and feed electric power from the vehicle to an electrical apparatus external to the vehicle or to a household. In the following, electric power feeding from a vehicle to a receiver external to the vehicle is also referred to simply as "external discharging."

Japanese Patent Laying-Open No. 2007-236023 (PTD 1) discloses a hybrid vehicle configured to be capable of external discharging. This hybrid vehicle performs external discharging in the following way. Namely, when the state of charge of a battery is higher than a predetermined state of charge, the hybrid vehicle feeds electric power stored in the battery to an external receiver and, when the state of charge of the battery is lower than the predetermined state of charge, the hybrid vehicle uses engine's motive power to generate electric power therefrom and feed the generated electric power to an external receiver.

CITATION LIST

Patent Document

PTD 1: Japanese Patent Laying-Open No. 2007-236023

SUMMARY OF INVENTION

Technical Problem

Generally, a vehicle mounted with an engine is equipped with a check engine light for informing a user of a malfunction of the engine. It is assumed, however, the user is absent (at a place away from the vehicle) during external discharging. Therefore, in the case where the engine is operated during external discharging as disclosed in PTD 1 and an engine malfunction occurs, a considerable time may have elapsed when the user finds the malfunction and manually stops the engine, even if the check engine light has been lit.

The present invention has been made to solve the above-described problem, and an object of the present invention is to appropriately determine, for a vehicle capable of external discharging, whether or not an engine has a malfunction, or appropriately perform a fail-safe control when determining that the engine has a malfunction, depending on the operating environment of the engine.

Solution to Problem

The vehicle according to the present invention is a vehicle capable of performing external discharging to supply electric power to an external electrical apparatus. The vehicle includes an engine, a generator configured to generate electric power using motive power of the engine, and a control device configured to determine, using a malfunction determination condition, whether or not the engine has a malfunction, and to perform a fail-safe control when determining that the engine has a malfunction. The control device changes at least one of the malfunction determination condition and the fail-safe control, depending on whether or not the external discharging is being done.

Preferably, the control device performs a first control as the fail-safe control when determining that the engine has a malfunction while the external discharging is not being done, and performs a second control as the fail-safe control when determining that the engine has a malfunction while the external discharging is being done. The second control is a control under which the engine is more likely to be stopped relative to the first control.

Preferably, the first control is a control for informing a user of the malfunction of the engine. The second control is a control for informing a user of the malfunction of the engine and stopping the engine.

Preferably, the second control includes a control for continuing an operation of the engine in a case where the malfunction of the engine does not hinder the operation of the engine, and stopping the engine in a case where the malfunction of the engine hinders the operation of the engine.

Preferably, the second control includes a control for continuing an operation of the engine in the event of occurrence of a disaster, and stopping the engine in the event of non-occurrence of a disaster.

Preferably, the control device sets a first condition as the malfunction determination condition in a case where the external discharging is not being done, and sets a second condition as the malfunction determination condition in a case where the external discharging is being done. The second condition is a condition under which a determination that the engine has a malfunction is more likely to be made, relative to the first condition.

Preferably, the first condition is a condition that a misfire malfunction of the engine has been detected in a current trip and a previous trip. The second condition is a condition that a misfire malfunction of the engine has been detected in a current trip.

Preferably, the control device sets a first condition as the malfunction determination condition in a case where the external discharging is not being done, and sets a second condition as the malfunction determination condition in a case where the external discharging is being done. The second condition is a condition under which a determination that the engine has a malfunction is less likely to be made, relative to the first condition.

Preferably, the control device further includes a selection device for allowing a user to select to change at least one of the malfunction determination condition and the fail-safe control in a case where the external discharging is being done.

The method for controlling the vehicle according to another aspect of the present invention is a method for controlling a vehicle capable of external discharging to supply electric power to an external electrical apparatus. The vehicle includes an engine, a generator configured to generate electric power using motive power of the engine, and a control device configured to determine, using a malfunction determination condition, whether or not the engine has a malfunction, and to perform a fail-safe control when determining that the engine has a malfunction. The method includes the steps of: determining whether or not the external discharging is being done; and changing at least one of the malfunction determination condition and the fail-safe control depending on whether or not the external discharging is being done.

Advantageous Effects of Invention

The present invention can appropriately determine, for a vehicle capable of external discharging, whether or not an engine has a malfunction, or appropriately perform a fail-safe control when determining that the engine has a malfunction, depending on the operating environment of the engine (depending on whether during external discharging or not, for example).

DESCRIPTION OF EMBODIMENTS

Embodiments of the present invention will hereinafter be described in detail with reference to the drawings. In the drawings, the identical or corresponding components are denoted by the identical reference characters, and a description thereof will not be repeated.

First Embodiment

Figure 1:
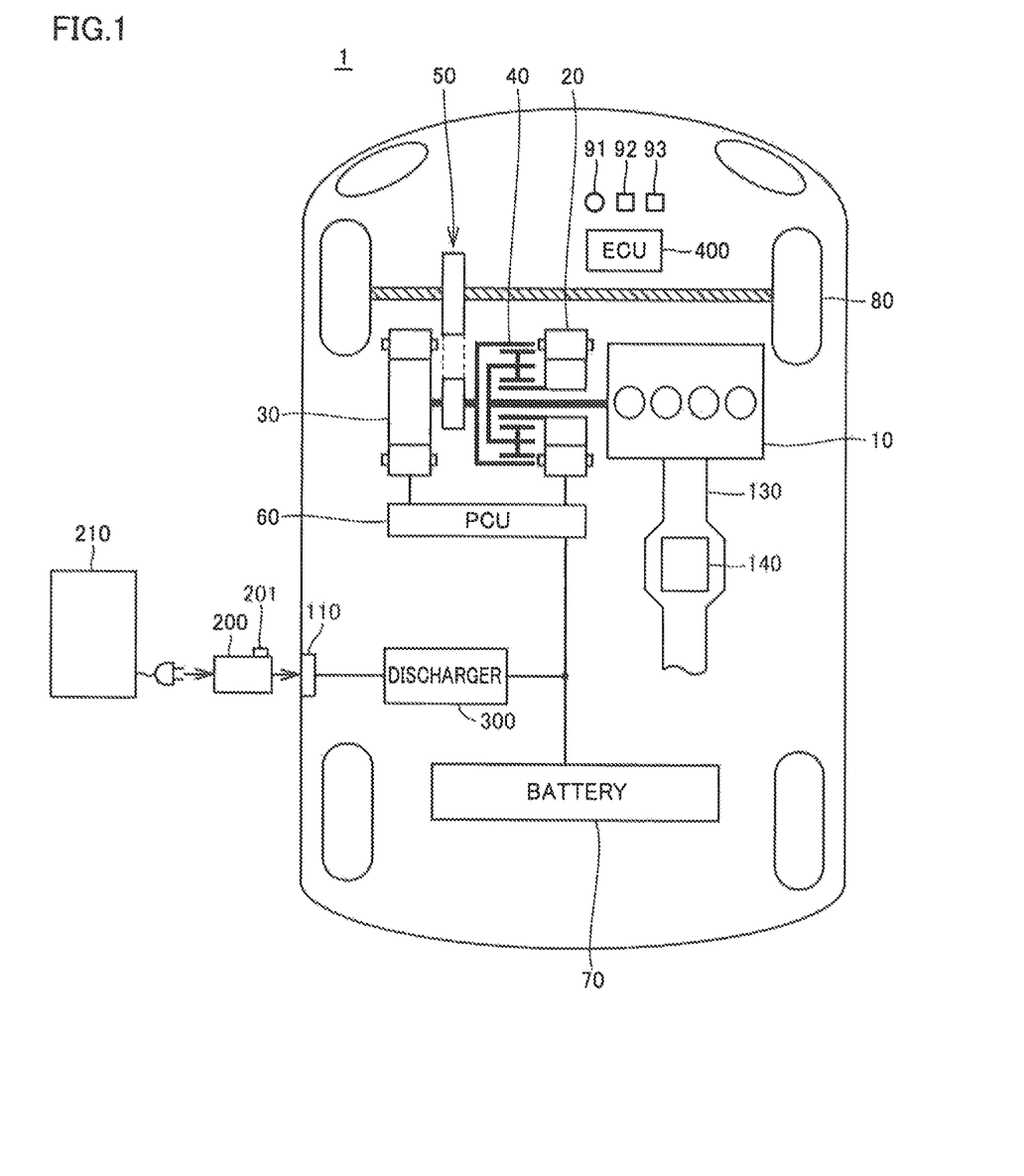
FIG. 1 is an entire block diagram of a vehicle.

FIG. 1 is an entire block diagram of a vehicle 1 according to the present embodiment. Vehicle 1 includes an engine 10, a first MG (Motor Generator) 20, a second MG 30, a power split device 40, a reducer 50, a PCU (Power Control Unit) 60, a battery 70, drive wheels 80, and an ECU (Electronic Control Unit) 400.

Vehicle 1 is caused to travel by a drive force which is output from at least one of engine 10 and second MG 30. Engine 10, first MG 20, and second MG 30 are coupled to power split device 40. Motive power generated by engine 10 is split by power split device 40 into two paths. Specifically, one is a path through which the power is transmitted via reducer 50 to drive wheels 80, and the other is a path through which the power is transmitted to first MG 20.

The exhaust from engine 10 is purified by a catalyst 140 provided on an exhaust pipe 130 and thereafter discharged to the atmosphere.

First MG 20 and second MG 30 are each an AC electric motor which is for example a three-phase AC synchronous electric motor. First MG 20 and second MG 30 are driven by PCU 60. First MG 20 generates electric power using the motive power of engine 10 which has been split by power split device 40. The electric power generated by first MG 20 is converted by PCU 60 from AC to DC and stored in battery 70.

Second MG 30 generates a drive force using at least one of the electric power stored in battery 70 and the electric power generated by first MG 20. The drive force of second MG 30 is then transmitted via reducer 50 to drive wheels 80.

At the time for example when the vehicle is braked, second MG 30 is driven by drive wheels 80 via reducer 50, and second MG 30 operates as an electric generator. Thus, second MG 30 also functions as a regenerative brake converting the kinetic energy of the vehicle into electric power. The electric power generated by second MG 30 is stored in battery 70.

Power split device 40 is formed of a planetary gear train including a sun gear, a pinion gear, a carrier, and a ring gear. The pinion gear meshes with the sun gear and the ring gear. The carrier supports the pinion gear in such a manner that enables the pinion gear to rotate about its axis, and is coupled to a crankshaft of engine 10. The sun gear is coupled to the rotational shaft of first MG 20. The ring gear is coupled to the rotational shaft of second MG 30 and to reducer 50.

PCU 60 receives electric power from battery 70, and drives first MG 20 and second MG 30 based on a control signal from ECU 400. PCU 60 also converts AC power generated by first MG 20 or second MG 30 into DC power based on a control signal from ECU 400, and outputs the DC power to battery 70.

Battery 70 is a rechargeable DC power storage device and is a secondary battery configured to include nickel-metal hydride or lithium ion for example. Instead of battery 70, a high capacity capacitor may also be used.

Vehicle 1 further includes a power feeding port 110 and a discharger 300 for feeding electric power to a receiver external to the vehicle (external discharging).

Discharger 300 is provided between power feeding port 110 and an electric power line which connects PCU 60 and battery 70 to each other. Based on a control signal from ECU 400, discharger 300 converts electric power which is generated by first MG 20 using the electric power stored in battery 70 or using motive power of engine 10, into electric power which can be used by an electrical apparatus 210 external to the vehicle, and outputs the converted electric power to power feeding port 110.

Electrical apparatus 210 external to the vehicle may be a common electrical product such as personal computer or an energy management facility installed in a house and called HEMS (Home Energy Management System). The HEMS is configured to be able to communicate with vehicle 1 and indirectly control external discharging of vehicle 1.

Power feeding port 110 is an electric power interface for performing external discharging. During external discharging, one end of a power connector 200 is connected to power feeding port 110. To the other end of power connector 200, electrical apparatus 210 is connected. In this state, user's pressing of a power feeding switch 201 provided on power connector 200 causes a state that enables external discharging.

Vehicle 1 further includes an MIL (Malfunction Indicator Light) 91, a navigation device 92, and a disaster mode switch 93.

MIL 91 is a warning lamp for informing a user of a malfunction of engine 10. Navigation device 92 uses the GPS (Global Positioning System) for example to obtain information about the current position of vehicle 1. Navigation device 92 can also obtain a variety of pieces of information such as disaster information, through communication with an external network.

Disaster mode switch 93 is a switch for a user to request a transition to a disaster mode. It is assumed that disaster mode switch 93 is pressed by a user in the case for example where vehicle 1 is to be used as a source of electric power supplied to a household in the event of a disaster.

ECU 400 uses a processor (not shown) to execute a program stored in an internal memory and thereby control each device of vehicle 1.

When user's pressing of power feeding switch 201 is detected, ECU 400 switches the control mode from a non-external-discharging mode to an external discharging mode. Likewise, when user's pressing of disaster mode switch 93 is detected, ECU 400 switches the control mode from a non-disaster mode to a disaster mode.

ECU 400 selects one of "engine-stopped discharging" of discharging electric power stored in battery 70 to an external receiver with engine 10 stopped, and "engine-operated discharging" of discharging electric power generated from the motive power of engine 10 to an external receiver with engine 10 operated, which is used for performing external discharging during the external discharging mode. For example, ECU 400 performs the engine-stopped discharging in the case where the state of charge (hereinafter also referred to as "SOC") of battery 70 is higher than a predetermined value, and performs the engine-operated discharging in the case where the SOC is lower than the predetermined value. It should be noted that in the case where the engine-operated discharging is performed, the electric power generated by first MG 20 using the motive power of engine 10 is supplied to external electrical apparatus 210 and also supplied to battery 70 to charge battery 70.

In vehicle 1 having the above-described configuration, ECU 400 determines whether or not engine 10 has a malfunction. When the engine has a malfunction, ECU 400 turns on MIL 91 to inform a user of the malfunction. From the state of MIL 91, the user can know whether or not the engine has a malfunction. In the case where MIL 91 is lit, the user can manually stop engine 10.

It is assumed, however, a user is at a place away from vehicle 1 during external discharging. Therefore, if the aforementioned "engine-operated discharging" is done during external discharging, engine 10 may be operated while the user is absent. In this case, even when a malfunction occurs to engine 10 to cause MIL 91 to be lit, the user is unaware of the malfunction and therefore engine 10 is kept operated. If such a state continues, catalyst 140 may be overheated to be damaged, for example.

In view of the above, ECU 400 in the present embodiment changes an engine malfunction determination condition and changes a fail-safe control when determining that the engine has a malfunction, depending on the operating environment of engine 10 (depending on whether during engine-operated discharging or not, for example).

Figure 2:
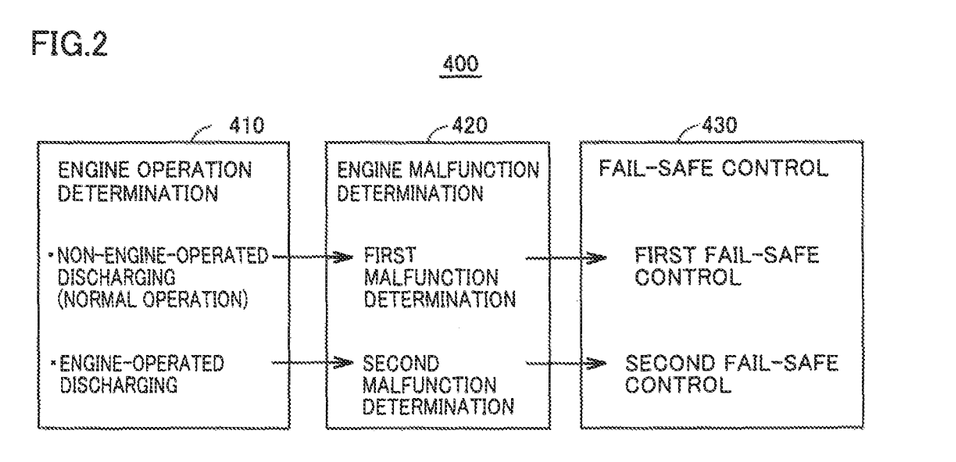
FIG. 2 is a functional block diagram of an ECU.

FIG. 2 is a functional block diagram of ECU 400. Each functional block shown in FIG. 2 may be implemented by hardware or implemented by software. ECU 400 includes a determination unit 410, a determination unit 420, and a control unit 430.

Determination unit 410 determines whether or not engine-operated discharging is being done while engine 10 is operated. For example, in the case where all of the following conditions 1 to 4 are met, determination unit 410 determines that engine-operated discharging is being done. Otherwise, determination unit 410 determines that engine-operated discharging is not being done.

Condition 1: Battery 70 is being charged (the rate of increase of the SOC is higher than a predetermined value).

Condition 2: Engine water temperature is a predetermined value or more (catalyst warm-up is not being done).

Condition 3: Power connector 200 is connected to power feeding port 110.

Condition 4: In the external discharging mode.

Determination unit 420 determines, while engine 10 is operated, whether or not engine 10 has a malfunction (misfire malfunction). Depending on the result of the determination (whether or not engine-operated discharging is being done) made by determination unit 410, determination unit 420 changes the engine malfunction determination condition.

In the case where engine-operated discharging is not being done (in the case where normal operation is being done), determination unit 420 uses a first malfunction determination condition to determine whether or not engine 10 has a malfunction. In the present embodiment, the first malfunction determination condition is a condition that a postulated misfire malfunction of engine 10 has been detected in two trips (the preceding trip and the latest trip). Determination unit 420 counts the number of times misfire has occurred, namely the number of times the engine rotation frequency, which is calculated based on the output of an engine rotation speed sensor (not shown) for example, has exceeded a threshold value $\alpha$. In the case where the number of times misfire has occurred per 1000 engine rotations exceeds a predetermined number $\beta$, determination unit 420 determines that engine 10 has a "postulated misfire malfunction." Then, in the case where the postulated misfire malfunction has been detected in the preceding trip and the latest trip, it is determined that engine 10 has a malfunction. A "trip" herein used is a unit representing a period in which the vehicle is travelling, and usually a period from the start to the subsequent stop of a vehicle system.

In contrast, in the case where engine-operated discharging is being done, determination unit 420 uses a second malfunction determination condition to determine whether or not engine 10 has a malfunction. The second malfunction determination condition is defined as a condition on which a determination that engine 10 has a malfunction is more likely to be made, relative to the first malfunction determination condition. In the present embodiment, the second malfunction determination condition is a condition that a postulated misfire malfunction of engine 10 has been detected in one trip (the latest trip). Namely, determination unit 420 counts the number of times misfire has occurred, namely the number of times the engine rotation frequency has exceeded threshold value $\alpha$. In the case where a postulated misfire malfunction, which is determined by the fact that the number of times misfire has occurred per 1000 engine rotations exceeds predetermined number $\beta$, has been detected in the latest trip, determination unit 420 determines that engine 10 has a malfunction.

In the present embodiment as seen from the above, the number of trips necessary for determining whether or not the engine has a malfunction based on the first malfunction determination condition is "two trips," while the number of trips necessary for determining whether or not the engine has a malfunction based on the second malfunction determination condition is a smaller number, namely "one trip." Accordingly, the second malfunction determination condition is a condition on which a determination that the engine has a malfunction is more likely to be made, relative to the first malfunction determination condition. Instead of or in addition to this method, another method may be used to change the malfunction determination condition. For example, "threshold value $\alpha$" or "predetermined number $\beta$" used for counting the number of times misfire has occurred may be changed. Namely, "threshold value $\alpha$" or "predetermined number β" used for the second malfunction determination condition may be made smaller than that for the first malfunction determination condition, so that the second malfunction determination condition is a condition on which a determination that the engine has a malfunction is more likely to be made, relative to the first malfunction determination condition.

In the case where determination unit 420 determines that engine 10 has a malfunction, control unit 430 performs a fail-safe control. Depending on whether or not the malfunction determination (i.e., determination that the engine has a malfunction) was made during the engine-operated discharging, control unit 430 changes the way to perform the fail-safe control.

In the case where the malfunction determination was made during normal operation, control unit 430 performs a first fail-safe control for informing a user of the malfunction by lighting MIL 91. On the assumption that the user is on the vehicle during normal operation, the first fail-safe control is performed to only give a warning to the user, without automatically stopping engine 10.

In the case where the malfunction determination was made during the engine-operated discharging, control unit 430 performs a second fail-safe control for informing a user of the malfunction by lighting MIL 91 and automatically stopping engine 10 when a predetermined automatic stop condition is met. Because there is a relatively high possibility that the user is absent during the engine-operated discharging, the second fail-safe control is performed to give a warning to the user and further automatically stop engine 10 when the automatic stop condition is met. Accordingly, even when the user is absent, engine 10 in the malfunctioning state will not be kept operated, and therefore, damage to catalyst 140 can be suppressed.

In the present embodiment, the automatic stop condition of engine 10 is defined as a condition that the temperature of catalyst 140 exceeds a threshold temperature. Namely, even when it is determined that a misfire malfunction has occurred, engine 10 is kept operated unless the temperature of catalyst 140 exceeds the threshold temperature, on the assumption that catalyst 140 is not damaged. Accordingly, stoppage of the engine-operated discharging can be delayed as much as possible, and a high urgency for external discharging in the event of a disaster, for example, can also be addressed. The temperature of catalyst 140 may be estimated from the operating history of engine 10 for example, or may be detected with a sensor.

Figure 3:
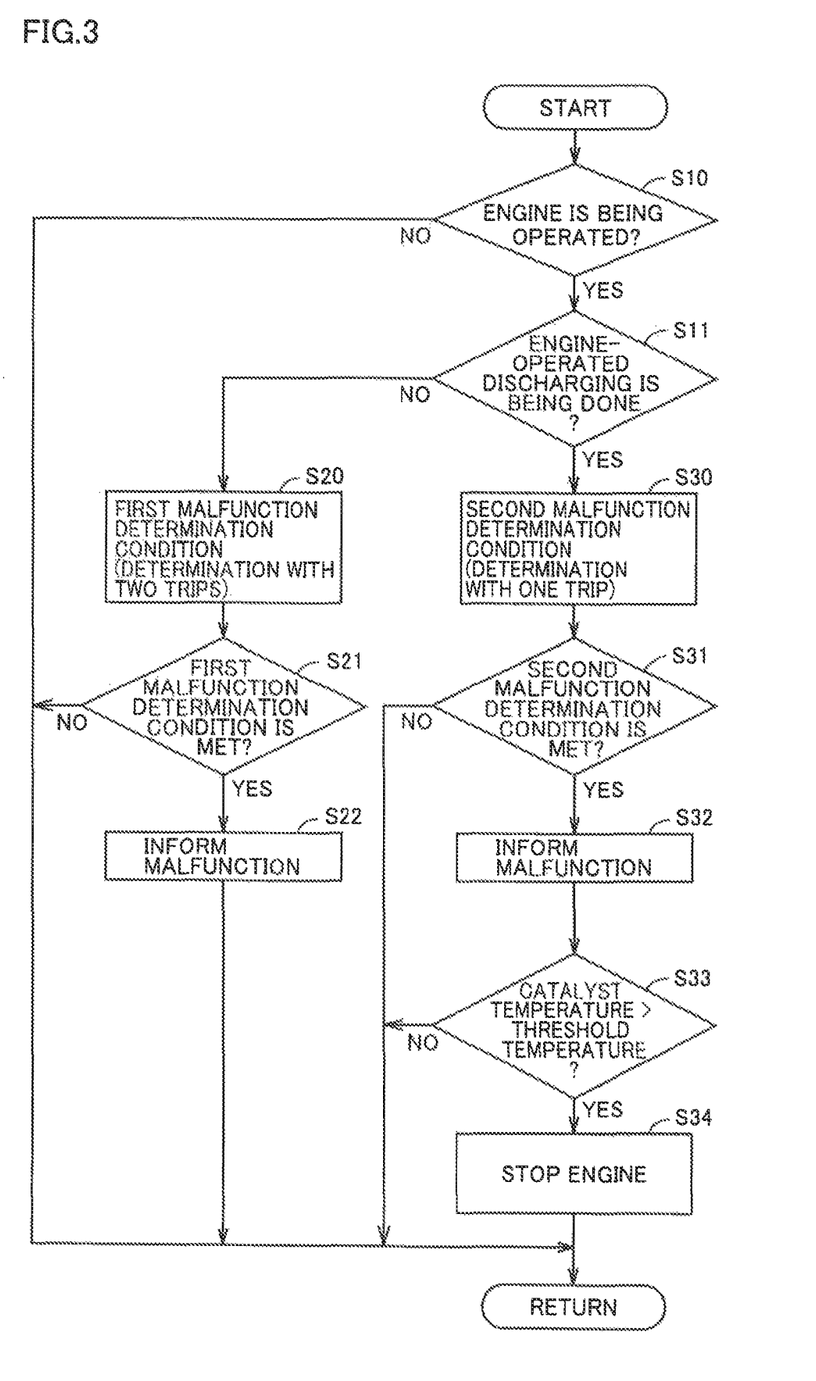
FIG. 3 is a (first) flowchart showing a process procedure of the ECU.

FIG. 3 is a flowchart showing a process procedure of ECU 400 for implementing the above-described functions. This flowchart is repeatedly performed in predetermined cycles.

In S10, ECU 400 determines whether or not engine 10 is being operated. In the case where engine 10 is not being operated (NO in S10), the process is ended.

In the case where engine 10 is being operated (YES in S10), ECU 400 causes the process to proceed to S11 to determine whether or not engine-operated discharging is being done.

In the case where engine-operated discharging is not being done, namely normal operation is being done (NO in S11), ECU 400 causes the process to proceed to S20 to set the above-described first malfunction determination condition (determination with two trips) as the engine malfunction determination condition.

In subsequent S21, ECU 400 determines whether or not the first malfunction determination condition is met. In the case where the first malfunction determination condition is not met (NO in S21), the process is ended.

In the case where the first malfunction determination condition is met (YES in S21), ECU 400 causes the process to proceed to S22 to light MIL 91 and thereby inform a user of the malfunction of engine 10. It should be noted that the operation in S22 corresponds to "first fail-safe control" as described above.

In contrast, in the case where engine-operated discharging is being done (YES in S11), ECU 400 causes the process to proceed to S30 to set the above-described second malfunction determination condition (determination with one trip) as the engine malfunction determination condition.

In subsequent S31, ECU 400 determines whether or not the second malfunction determination condition is met. In the case where the second malfunction determination condition is not met (NO in S31), the process is ended.

In the case where the second malfunction determination condition is met (YES in S31), ECU 400 causes the process to proceed to S32 to S34. It should be noted that the operations in S32 to S34 correspond to "second fail-safe control" as described above.

In S32, ECU 400 lights MIL 91 to thereby inform the user of an engine malfunction. On the assumption that the user is absent (at a place away from vehicle 1) during external discharging, the malfunction may be communicated to the HEMS, the malfunction may be communicated to a smart phone carried by the user, a horn mounted on the vehicle may be blown, or lights may be flashed, instead of or in addition to lighting MIL 91.

In subsequent S33, ECU 400 determines whether or not the temperature of catalyst 140 is higher than a threshold temperature.

In the case where the temperature of catalyst 140 is not higher than the threshold temperature (NO in S33), ECU 400 keeps engine 10 operating without stopping engine 10.

In the case where the temperature of catalyst 140 is higher than the threshold temperature (YES in S33), ECU 400 causes the process to proceed to S34 to stop engine 10.

In this way, ECU 400 in the present embodiment changes the engine malfunction determination condition and changes the fail-safe control when determining that the engine has a malfunction, depending on whether or not the engine-operated discharging is being done. Specifically, during normal operation where it is assumed that the user is on the vehicle, ECU 400 determines that the engine has a malfunction from the fact that a postulated misfire malfunction has been detected in two trips, and informs the user of the malfunction. In contrast, during engine-operated discharging where there is a possibility that the user is absent, ECU 400 determines that the engine has a malfunction from the fact that a postulated misfire malfunction has been detected in one trip, informs the user of the malfunction, and causes the engine to be automatically stopped. Therefore, even if the user is absent, engine 10 will not be kept operated in the malfunctioning state. Accordingly, damage to catalyst 140 can be suppressed.

First Modification of First Embodiment

In the first embodiment as described above, it is more likely to be determined, during engine-operated discharging, that a misfire malfunction (emission malfunction) has occurred. In the case where it is determined that a misfire malfunction has occurred, the engine is automatically stopped to thereby suppress catalyst damage due to the misfire malfunction.

In the case, however, where a disaster occurs and vehicle 1 is used as an electric power source, there is a high urgency (need) for external discharging. In such a case, even when some misfire malfunction has occurred, external discharging should be given priority. Taking this into consideration, the engine malfunction determination condition may entirely or partially be alleviated (namely it is made less likely that it is determined that a misfire malfunction has occurred) during engine-operated discharging, relative to the case where the engine-operated discharging is not being done.

For example, threshold value α, which is used when the number of times misfire has occurred is counted, may be set to "α1" during normal operation, while threshold value α may be set to a greater value "α2" (α2>α1) during engine-operated discharging. Accordingly, the count of the number of times misfire has occurred during the engine-operated discharging is made less than that during the normal operation. Therefore, even when some misfire malfunction occurs, the engine-operated discharging (external discharging) can be continued.

Alternatively, the determination itself of whether or not the engine has a malfunction may not be made during the engine-operated discharging.

Second Modification of First Embodiment

In the first embodiment as described above, ECU 400 automatically changes the engine malfunction determination condition and the fail-safe control, depending on whether or not the engine-operated discharging is being done.

In contrast, a user may make a selection as to whether to change the engine malfunction determination condition and the fail-safe control or not. For example, ECU 400 may determine whether or not the user presses disaster mode switch 93 for requesting a transition to the disaster mode, and change the engine malfunction determination condition and the fail-safe control, depending on the result of this determination. The user is thus allowed to make a selection by him or herself as to whether protection of the parts should be given priority or external discharging should be given priority when a misfire malfunction occurs.

Second Embodiment

In the first embodiment as described above, the engine is automatically stopped in the case where a misfire malfunction occurs during the engine-operated discharging.

It is assumed, however, that a commercial power supply in each home is unavailable in the event of a disaster and, in such a case, there is a high urgency (need) for supply of electric power from the vehicle to a household, as described above. If, regardless of this, the engine is stopped immediately after occurrence of a misfire malfunction to stop the engine-operated discharging, only a small amount of electric power is left that can be supplied from the vehicle to the household. Therefore, in the event of a disaster, it is desired in some cases to keep the engine operating if the malfunction is not critical.

In view of the above, in the present second embodiment, even when an engine malfunction occurs during the engine-operated discharging, engine 10 is kept operating as long as the engine still works unhindered, in the event of a disaster.

Figure 4:
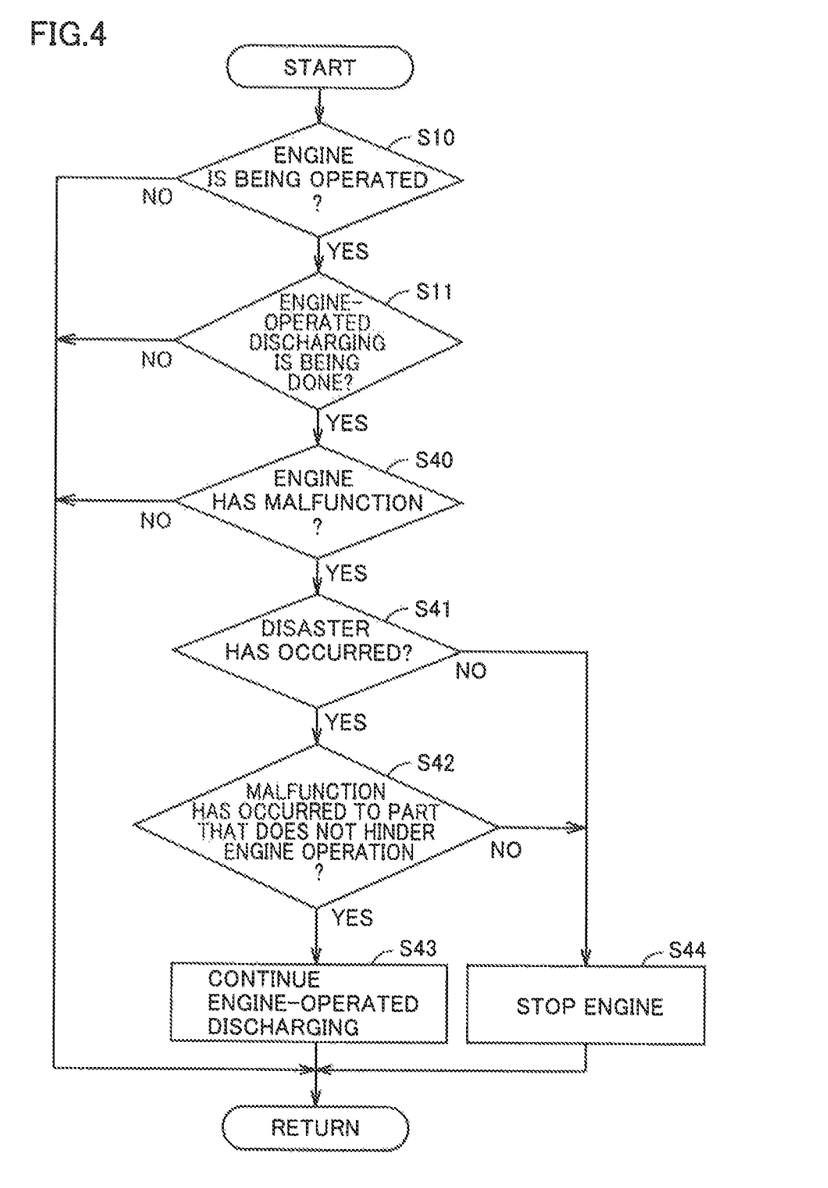
FIG. 4 is a (second) flowchart showing a process procedure of the ECU.

FIG. 4 is a flowchart showing a process procedure of ECU 400 in the second embodiment. Regarding steps shown in FIG. 4 that are indicated by the same numerals as the steps shown in FIG. 3 as described above, the detailed description given above will not be herein repeated.

In the case where engine-operated discharging is being done (YES in S10 and YES in S11), ECU 400 causes the process to proceed to S40 to determine whether or not an engine malfunction has occurred. Regarding this determination, in addition to a determination of whether or not a misfire malfunction has occurred as described above in connection with the first embodiment, a determination of whether or not a malfunction of an engine-related part (exhaust-related part such as air-fuel ratio sensor for example) has occurred is also made.

In the case where an engine malfunction has occurred (YES in S40), ECU 400 causes the process to proceed to S41 to determine whether or not a disaster has occurred, more specifically whether or not vehicle 1 is used as an electric power source in the event of a disaster. In the case where the user presses disaster mode switch 93 for requesting a transition to the disaster mode, for example, ECU 400 determines that a disaster has occurred. In response to reception of disaster information from an information appliance such as a smart phone carried by the user, HEMS, navigation device 92, or the like, ECU 400 may determine that a disaster has occurred.

In the case where a disaster has occurred (YES in S41), ECU 400 causes the process to proceed to S42 to determine whether or not the malfunction has occurred to a part that does not hinder the engine operation. In the case where the malfunction has occurred to an exhaust-related part such as air-fuel ratio sensor for example, ECU 400 determines that the part to which the malfunction has occurred is a part that does not hinder the engine operation.

In the case where the part to which the malfunction has occurred is a part that does not hinder the engine operation (YES in S42), ECU 400 causes the process to proceed to S43 to continue the engine-operated discharging without stopping engine 10.

In contrast, in the case where a disaster has not occurred (NO in S41) or in the case where the part to which the malfunction has occurred is not a part that does not hinder the engine operation (NO in S42), ECU 400 causes the process to proceed to S44 to stop engine 10 and accordingly stop the engine-operated discharging.

As seen from the above, in the case where an engine malfunction occurs during the engine-operated discharging, ECU 400 in the present embodiment performs a fail-safe control for immediately stopping engine 10 unless a disaster has occurred, while ECU 400 performs a fail-safe control for continuing the operation of engine 10 if a disaster has occurred, as long as the engine works unhindered. Thus, in the event of a disaster where there is a high urgency for external discharging, the engine-operated discharging is continued to as much as possible to thereby ensure that electric power can be supplied to a household.

In the present embodiment, whether or not a disaster has occurred is determined based on user's operation of disaster mode switch 93. Therefore, the user can make a selection as to whether or not the fail-safe control is to be performed in the event of a disaster.

While FIG. 4 does not particularly show the engine malfunction determination condition and the fail-safe control in the case where the engine-operated discharging is not being done (NO in S11), they may be made different from the engine malfunction determination condition (S40) and the fail-safe control (S41 to S44) in the case where the engine-operated discharging is being done, like the first embodiment.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 vehicle; 10 engine; 20 first MG; 30 second MG; 40 power split device; 50 reducer; 60 PCU; 70 battery; 80 drive wheel; 91 MIL (check engine light); 92 navigation device; 93 disaster mode switch; 110 power feeding port; 130 exhaust pipe; 140 catalyst; 200 power connector; 201 power feeding switch; 210 electrical apparatus external to vehicle; 300 discharger; 400 ECU; 410, 420 determination unit; 430 control unit

The invention claimed is:

1. A vehicle capable of performing external discharging to supply electric power to an external electrical apparatus, comprising:
an engine;
a generator configured to generate electric power using motive power of said engine; and
a control device configured to determine, using a malfunction determination condition, whether or not said engine has a malfunction, and to perform a fail-safe control when determining that said engine has a malfunction,
said control device changing at least one of said malfunction determination condition and said fail-safe control, depending on whether or not said external discharging is being done.

2. The vehicle according to claim 1, wherein
said control device performs a first control as said fail-safe control when determining that said engine has a malfunction while said external discharging is not being done, and performs a second control as said fail-safe control when determining that said engine has a malfunction while said external discharging is being done, and
said second control is a control under which said engine is more likely to be stopped relative to said first control.

3. The vehicle according to claim 2, wherein
said first control is a control for informing a user of the malfunction of said engine, and
said second control is a control for informing a user of the malfunction of said engine and stopping said engine.

4. The vehicle according to claim 3, wherein said second control includes a control for continuing an operation of said engine in a case where the malfunction of said engine does not hinder the operation of said engine, and stopping said engine in a case where the malfunction of said engine hinders the operation of said engine.

5. The vehicle according to claim 3, wherein said second control includes a control for continuing an operation of said engine in the event of occurrence of a disaster, and stopping said engine in the event of non-occurrence of a disaster.

6. The vehicle according to claim 1, wherein
said control device sets a first condition as said malfunction determination condition in a case where said external discharging is not being done, and sets a second condition as said malfunction determination condition in a case where said external discharging is being done, and
said second condition is a condition under which a determination that said engine has a malfunction is more likely to be made, relative to said first condition.

7. The vehicle according to claim 6, wherein
said first condition is a condition that a misfire malfunction of said engine has been detected in a current trip and a previous trip, and
said second condition is a condition that a misfire malfunction of said engine has been detected in a current trip.

8. The vehicle according to claim 1, wherein
said control device sets a first condition as said malfunction determination condition in a case where said external discharging is not being done, and sets a second condition as said malfunction determination condition in a case where said external discharging is being done, and
said second condition is a condition under which a determination that said engine has a malfunction is less likely to be made, relative to said first condition.

9. The vehicle according to claim 1, wherein said control device further includes a selection device for allowing a user to select to change at least one of said malfunction determination condition and said fail-safe control in a case where said external discharging is being done.

10. A method for controlling a vehicle capable of external discharging to supply electric power to an external electrical apparatus,
said vehicle including:
an engine;
a generator configured to generate electric power using motive power of said engine; and
a control device configured to determine, using a malfunction determination condition, whether or not said engine has a malfunction, and to perform a fail-safe control when determining that said engine has a malfunction,
said method comprising the steps of:
determining whether or not said external discharging is being done; and
changing at least one of said malfunction determination condition and said fail-safe control depending on whether or not said external discharging is being done.

* * * * *